June 25, 1935.  C. PFANSTIEHL  2,005,752
METHOD OF PREPARING PEN POINTS
Filed Jan. 13, 1934  3 Sheets-Sheet 1
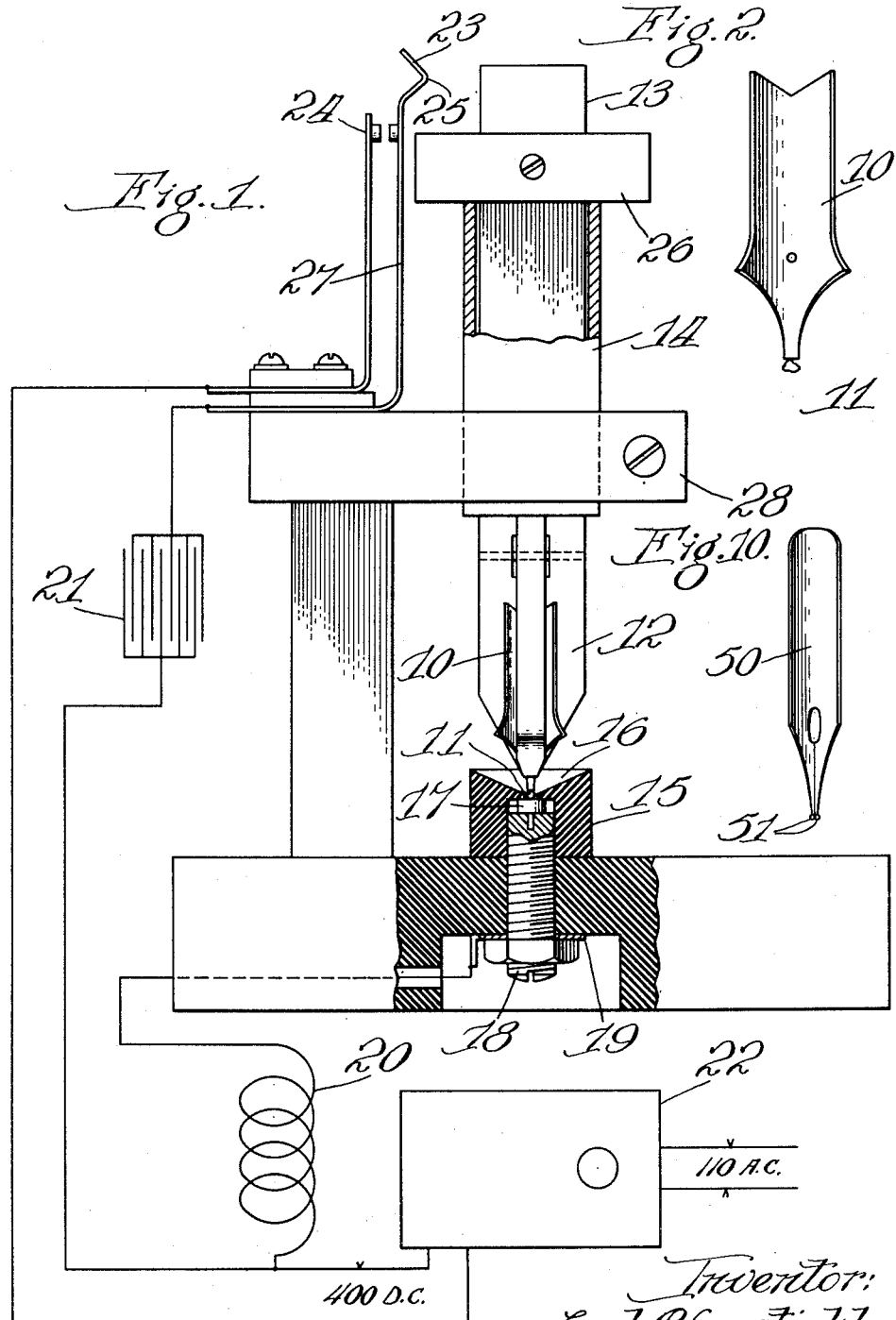
Inventor:
Carl Pfanstiehl.
By Dynenforth, Lee, Chritton & Wiles
Attys.

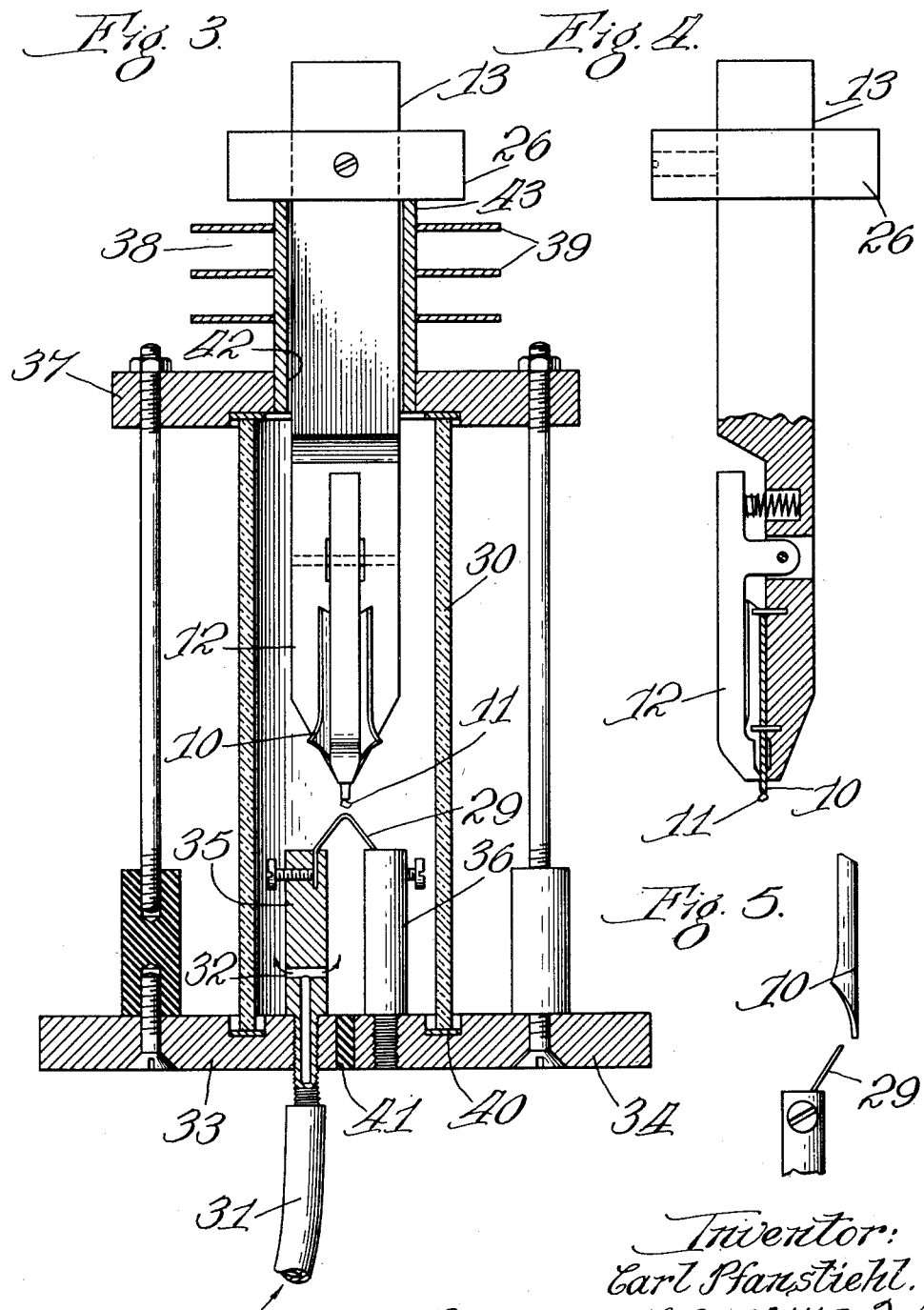

June 25, 1935.  C. PFANSTIEHL  2,005,752
METHOD OF PREPARING PEN POINTS
Filed Jan. 13, 1934  3 Sheets-Sheet 3
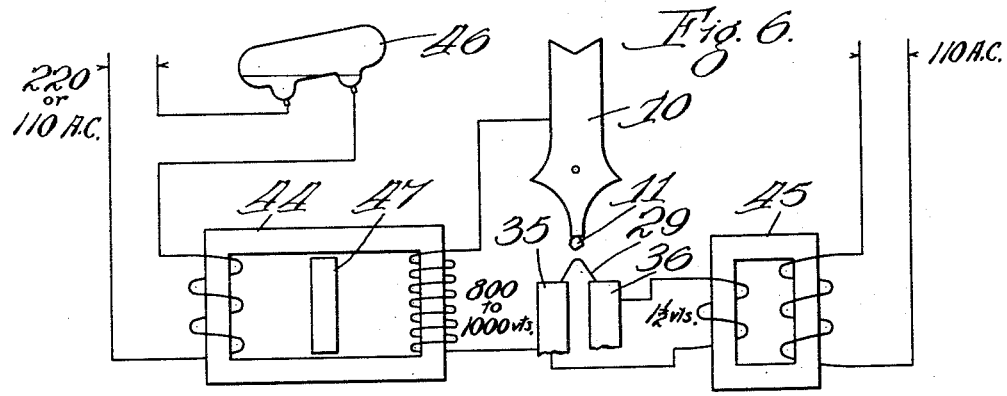
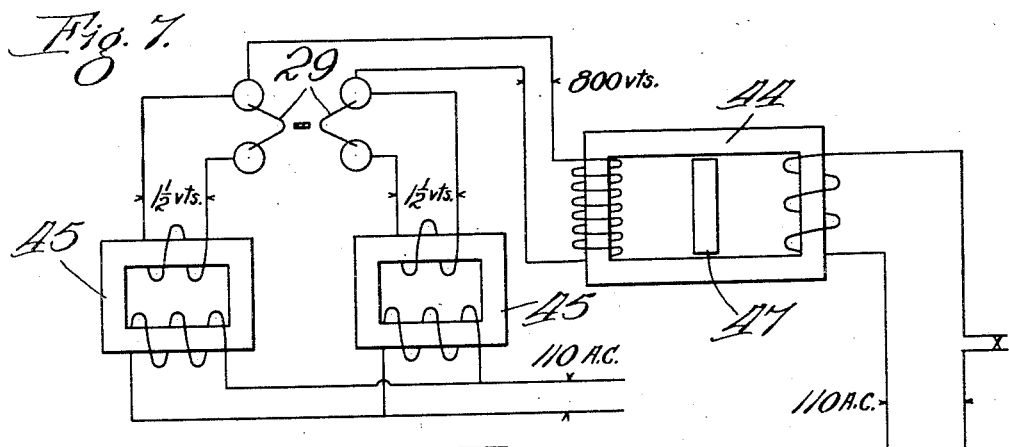
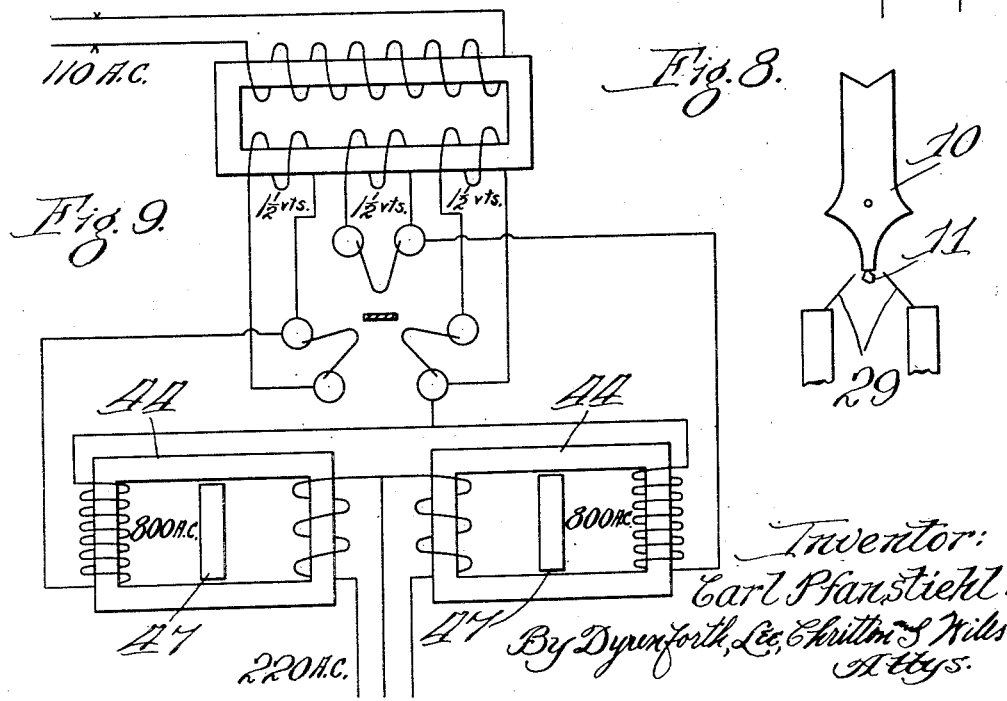
Inventor:
Carl Pfanstiehl.
By Dyrenforth, Lee, Chritton & Wiles
Attys.

Patented June 25, 1935

2,005,752

UNITED STATES PATENT OFFICE 2,005,752

METHOD OF PREPARING PEN-POINTS

Carl Pfanstiehl, Highland Park, Ill., assignor to Pfanstiehl Chemical Co., a corporation of Illinois Application January 13, 1934, Serial No. 706,565

29 Claims. (Cl. 219—10)

This invention relates to a method of preparing pen-points.

It is well recognized that the so-called iridium tips cannot, under present practice, be welded or fused to the formed pen nibs. In previous practice, pen nibs, particularly fountain-pen nibs, were prepared by rolling a thick pointed gold strip. The point of this was then pinched, and the depression so caused wet with a sticky flux and an "iridium" pellet affixed thereto. Later an oxyhydrogen flame was blown upon the iridium until the gold fused and enclosed the point. Great care had to be exercised in this operation or the gold would melt back too far, and in every case the heat would flow back and draw the temper of the nib. In nearly every instance the iridium would lean to one side or the other. The blanks were then rolled thin, with the iridium nested in a depression. The blank was rolled several times with annealing between every rolling operation. The iridium was then hand-ground to center it and the blank pen then blanked out. In the best controlled operations the loss of iridium and pens ran around 10–15%.

In accordance with the present invention, a pen nib, complete except for the hard point and splitting, is used as a base, an iridium or other hard metallic tip temporarily affixed thereto, and the tip then welded directly to the pen. By means of the improved process, there is an enormous saving in time and labor costs, the amount of iridium required is cut almost in half, and the loss of nib and point material is cut to less than one-half of one per cent.

The invention is illustrated in the drawings, in which Fig. 1 represents a diagrammatic elevation, partly in broken section, of the apparatus for temporarily fixing the tips to the pens. A wiring diagram is included in Fig. 1. Fig. 2 shows the blank pen point with the tip temporarily fixed thereto; Fig. 3 is a broken sectional elevation of the welding apparatus; Fig. 4 is a broken sectional side elevation of the jaws of the welding apparatus in which the pen-point is held; Fig. 5 is a side elevation in broken section showing the pen point in relation to the filament shown in Fig. 3, with the filament set off to one side; Fig. 6, the diagrammatic wiring sketch for the welding apparatus shown in Fig. 3; Fig. 7, an optional wiring diagram in which two tungsten filaments are used, one at each side of the pen-point; Fig. 8 shows the arrangement of the filaments with respect to the pen for an apparatus using two filaments as shown in Fig. 7; and Fig. 9 shows a three-phase wiring diagram using three tungsten filaments set about the pen-point, each operating upon a different phase.

The tip-centering or tacking apparatus comprises jaws 12 in which the pen-nib 10 is held, the jaws being part of a copper holder 13 provided with a brass sleeve 14. An insulating block 15 is provided with a conical depression 16 in which the iridium tip 11 nests, resting upon a tungsten contact 17. This contact is electrically connected in series, in this instance through a brass screw 18 and the connection 19 to an inductance 20, a condenser 21, and copper holder 13 and pen nib 10. The tube rectifier 22 is designed to rectify a 110 volt A. C. current to a 400 volt D. C. current and supplies this to the condenser circuit. A charging switch 23 is provided, connected on one side to the condenser 21 and on the other to the 400 volt D. C. rectifier. The other 400 volt D. C. rectifier is connected to the other terminal of the condenser 21. As the holder 13 is dropped into the tacking apparatus the collar 26 contacts with the neck 25 of the charging switch 23 which is carried by the spring 27. The switch is thus momentarily closed through the contacts 24, charging the condenser 21. When the nib lightly touches the pellet a discharge occurs, the nib being connected to the circuit at that time through the ring 28 which is of brass. The discharge welds or "tacks" the tip lightly to the nib. It has been discovered that the inductance 20 is desirable in order to slow down the oscillatory discharge from the condenser sufficiently to permit the descending pen-nib time to follow up and maintain contact with the iridium pellet during the discharge. With the voltage shown, and a condenser of the order of 8 to 25 microfarads, a small inductance obtained by winding No. 16 magnet wire 100 or so turns about a paper tube 2½" in diameter and connected in series with the condenser, the pen-nib, and the tungsten disk circuit, is sufficient for this purpose.

The electric discharge generally appears to take place when the tip and nib have moved into light contact, but it is more probable that it actually occurs when they are in close proximity, although the distance between them may be very slight.

As a result of the tacking process, the tip and nib are lightly welded together, the area of the weld being relatively very small as compared with the area of the tip. It is important, in view of the subsequent arc welding treatment, that this area be kept low.

The pen nib is generally composed of a gold alloy, usually of about 14 K., but it may be composed of other metals. The tip, on the other hand, is generally of a relatively hard high melting point metal or alloy, generally containing osmium and some iridium and other metals. The melting point of the tip is normally very much higher than that of the pen nib. In the welding operation, therefore, the nib tends to melt first, but it has been discovered that by maintaining a small area of contact between the tip and nib, the thermal resistance through the pellet and weld to the nib is sufficiently high and its position with respect to the arc is such that the tip temperature is raised far above the melting point of the nib before the nib has a chance to fuse. Moreover, the contact area being small, there is very little heat transfer from the tip to the nib until the area of contact is enlarged, and the welding operation is then terminated before the nib fuses unduly. Moreover, cooling means are provided immediately beyond the portion of the nib adjacent to the tip so that only that portion of the nib for 1/64 to 1/32 of an inch beyond the tip is fused.

The tips come in various sizes, roughly in the shape of spherical pellets. It has been found that by use of the present process there is so little loss in grinding that the size of the pellets may be roughly cut in half; for example, where formerly pellets running 1800 to the ounce were required, tips now may be used which run 3200 to the ounce.

Following the tacking operation the nib, still held in the jaws 12, is placed in the welding apparatus as shown in Fig. 3. This apparatus comprises a tungsten filament 29, centrally located near the bottom of a Pyrex glass enclosed chamber 30, set in rubber gaskets 40. A hose 31 having outlets 32 is provided below the filament for the admission of a gentle stream of hydrogen or other readily ionizable gas. Hydrogen is preferred because of its tendency to prevent the formation of a metallic arc and because it provides a reducing atmosphere. The base of chamber 30 is divided by insulation 41 into portions 33 and 34. Filament 29 is set in copper circuits 35 and 36, which are electrically connected to the welding circuit as indicated in Fig. 6. A copper cover 37 is provided at the top of chamber 30, and is supplied with a central aperture 42 for the nib and holder to pass through. This opening is preferably substantially closed by the holder, but sufficient space is left for the gases to escape. Rising from the cover 37 is the neck 38, provided with copper cooling fins 39. Other cooling means may of course be substituted, for example, water cooling means. The collar 26 of the holder 13 seats itself upon the shoulders 43 of the neck 38, and thereby establishes the proper distance between the tip 11 and the filament 29.

As shown in Fig. 4, the nib is held by the jaws 12 a very short distance from the tip. Generally this distance will be from $\frac{1}{32}$ to $\frac{1}{16}$ of an inch or less, but the distance depends upon the thickness of the nib, the relative melting points of the tip and nib, and other factors which will be obvious to one skilled in the art. The cooling effect of the jaws plus the connected cooling means on the neck is sufficient to prevent any of the nib except that exposed from fusing, or even reaching a temperature which will draw the temper from the nib. Further, if the area of contact between the tip and nib is very small, there is little heat conducted from the tip into the nib until the tip is substantially fused. The duration of the arc is preferably timed so that it will not continue unduly after complete fusion of the tip.

Fig. 5 shows a preferred setting of the filament, the wire being off to one side so that if the tip should fall from the nib it would not catch upon the filament. Other modifications of the arrangement of the filament are shown in Figs. 7, 8 and 9. Figs. 7 and 8 show two filaments angularly disposed at opposite sides of the tip, while Fig. 9 shows three filaments angularly disposed about the tip. In Fig. 9 a three-phase system is provided, each filament operating on one phase.

As is shown in Fig. 6, the arc circuit comprises a 220 or 110 volt A. C. supply which is stepped up by the transformer 44 to 800–1000 volts. The tungsten filament is continuously heated by a high amperage low voltage current, for example 30 amperes and 1½ volts from the step-down transformer 45 which may be connected to an ordinary 110 volt A. C. supply. The operation of the arc is controlled by the mercury timing switch 46 which may be set to cause an arc of any desired duration. With a hot tungsten filament and an ionizing atmosphere of hydrogen and a gap of about ⅛" between the hot filament and the cold pellet, a time of the order of 1 to 2 seconds is satisfactory. The hot filament ionizes the hydrogen and thereby greatly lowers the resistance of the gap so that only 800 to 1000 volts is necessary to start the arc in hydrogen.

As a matter of fact, the time is not critical, because the instant the weld has been completed and a globule of gold-coated iridium formed, the thermal contact between the iridium and the gold is so greatly improved that the globule of gold actually freezes and does not melt back any further, no matter how long the arc may be maintained, the excess heat being rapidly taken up by the copper jaws holding the pen nib.

A magnetic shunt 47 is provided in the transformer 44 in order to prevent any sudden excessive rush of current upon the establishment of the arc.

In carrying out the welding operation, the pen nib with the tip tacked on is grasped in the jaws 12 of the holder 13 with the nib exposed only $\frac{1}{16}$" or less beyond the end of the jaws. In the meantime the tungsten filament current has been started so that the filament is hot and a stream of hydrogen is passed gently through the chamber 30 and ionizes as it passes the filament. The stream should be sufficiently slow so that the atmosphere in the chamber is substantially quiescent. The holder 13 is then placed in the welding apparatus and the timing switch started. With a distance of about ⅛" between the tip and the filament an arc will start readily upon 700 to 800 volts in an ionized hydrogen atmosphere. If the gas is not ionized, about 7,000 to 12,000 volts will be required to jump a gap of about $\frac{1}{16}$", but inasmuch as the resistance of the gap drops very greatly the instant the arc is started, it would also be necessary to provide excessive resistance in the secondary of the transformer and the amount of power used in the transformer would be excessive. The ionized atmosphere is therefore very much preferred.

The operation of the arc is to heat the high melting point tip first to a point above the melting point of the nib and then to fuse a portion of the exposed gold nib, the fused nib metal enclosing the tip. Inasmuch as the tip is directly below the nib, the result is a very well finished spheroidal tip perfectly centered upon the nib. The tip may then be ground and burnished as required to finish off the tip, after the nib and hard point have been slitted in the usual way.

In practicing the invention the tip may or may not be fused, or it may be partially fused. In the simplest form the tip is not fused appreciably, but the adjacent nib melts and the nib metal then wets the tip and welds the nib and tip together. The fused nib metal will form a spheroidal drop with the pellet or tip in the center.

In some instances the tip may also be partially fused. In others it may be entirely fused, or at least so much so as to produce an essentially tip-metal spheroid. In these instances it is not necessary to grind the spheroid down to the underlying pellet metal as may be the case where the coating is all nib metal.

Moreover, whereas formerly an attempt was made to procure pellets which were as spherical as possible, in certain applications of the present process irregular-shaped pellets work as well or even better than spherical ones under certain conditions. In dealing with irregular-shaped tips, the arc current should be increased considerably to cause fusion of the pellet, and $\frac{1}{32}"$ or less of the pen nib should be extended beyond the jaws 12. Under these conditions the more irregular-shaped the pellet is, the quicker it appears to form into a sphere. Apparently this is due to the fact that the irregular pieces have greater surface area and absorb heat more rapidly. The result of the operation is that enough heat is flashed into the irregular pellet to cause the pellet to melt and form a sphere by surface tension before the gold or other metal of the nib has time to melt and surround it.

In Fig. 7 a different type of arc is shown in which the arc is provided across two filaments 29 instead of between the filament and the pen nib. With this type of apparatus, the filaments may be maintained about $\frac{1}{8}"$ to $\frac{1}{4}"$ apart.

In Fig. 9, a three-phase arrangement is shown with two transformers 44 with shunts 47 and the arc is provided between the three filaments, each operating upon a different phase and each highly insulated from the others. This method produces a little hotter and larger arc. The nib should be held in the center and slightly above the points of the three filaments.

The invention may also be used with an ordinary steel pen by exposing the tip of the pen to the arc. In this way a perfect sphere or globule of steel is formed on the end of the pen and may be readily split in the usual way. Substantially no buffing is required, but a perfectly smooth writing point is obtained. Similarly an ordinary steel pen-nib may be formed to shape and split, but the end not polished for writing. It may be then placed in the welding apparatus with the two points of the nib separated a few thousandths of an inch and exposed to the arc in the usual manner, except that the time and maximum current should be cut down considerably. In this manner a perfectly rounded surface of glassy smoothness is produced on each separate point of the pen. When an air hardening steel is used for the nib, the sudden heating and cooling produces the maximum hardness at the tip of the pen.

Fig. 10 shows a steel pen 50 treated with its point split to produce a spheroidal globule 51 upon each tip. The treatment may be carried so far as to produce a substantially spherical globule, or it may be stopped somewhat short of this when the tip is simply rounded or smoothed, in a somewhat similar fashion to the manner in which a rough piece of glass may be smoothed by heat. In either event, with a properly hardening steel, the tip itself is hardened to a degree which is not possible for the entire pen.

The welding process is particularly advantageous in connection with tips which have been asymmetrically attached to the point of the nib. This is a common difficulty in attempting to attach pellets by ordinary methods. Where a pellet has been asymmetrically attached and is welded in the manner herein described, the spherical globule when formed centers itself by means of gravity and surface tension upon the nib. It is therefore unnecessary to procure absolute centering in the tacking operation.

While an A. C. arc has been specified in the welding operation, a D. C. arc may be used if desired. In this manner the arc is a little hotter at one side and if two filaments are used the nib may then be located near the hotter or less hot end of the arc as desired. The D. C. current may be filtered to give a relatively steady voltage. If a D. C. current is used with a single filament, the circuit may be so arranged as to make the tip the hot or cold side of the arc, depending upon the characteristics of the metals employed. Thus for a low melting point metal the cool side may be used, and for a high melting point metal the hot side may be used.

The foregoing detailed description has been given for clearness of understanding only, and no unnecessary limitations should be understood therefrom, but the appended claims should be construed as broadly as permissible, in view of the prior art.

What I claim as new and desire to secure by Letters Patent is:

1. The method of tipping a metallic nib with a metallic tip which comprises tacking an irregularly shaped tip upon the point of said nib, the area of contact being small, suspending said nib vertically above the tip, and fusing said tip and the adjacent portion of said nib in an electric arc whereby a spherical tip is formed upon said nib.

2. The method of symmetrically welding an asymmetrically attached tip to a nib which comprises vertically suspending said nib above said tip and fusing said tip in an electric arc whereby said tip forms a spherical globule and centers itself symmetrically upon said nib.

3. The method of tipping a metallic base which comprises tacking a metallic tip to the base, the tack providing poor heat conductivity between tip and base, and fusing metal adjacent to the tack by heat supplied substantially entirely through the tip, whereby the tip is welded to the base.

4. The method of tipping a metallic base which comprises tacking a metallic tip to the base by passing a sudden large electric discharge between the base and tip while lightly contacting them, said discharge being only sufficient to fuse a small area of the contacting metals, and then fusing metal adjacent to the tack by heat supplied substantially entirely through the tip, whereby the tip is welded to the base.

5. The method as set forth in claim 3, in which the base is vertically suspended over the tip during the welding operation.

6. The method as set forth in claim 3, in which the welding heat is supplied by an electric arc.

7. The method as set forth in claim 3, in which the area of contact between the tip and base is small relative to the tip.

8. The method as set forth in claim 3, in which the rate of heat input is such that after fusion the increased heat conductivity causes freezing of the metal at the weld.

9. The method as set forth in claim 3, in which the rate of heat input is such that after fusion the increased heat conductivity causes freezing of the metal at the weld and in which the base is cooled except immediately adjacent to the tack.

10. The method as set forth in claim 3, in which the rate of heat input is such that after fusion the increased heat conductivity causes freezing of the fused metal.

11. The method as set forth in claim 3, in which the heat is supplied by an electric arc including the tip, and said arc is initiated in an atmosphere of ionized gas.

12. The method as set forth in claim 3, in which the heat is supplied by an electric arc including the tip, and said arc is initiated in an atmosphere of ionized hydrogen.

13. The method as set forth in claim 3, in which heat is supplied by an arc including the tip and another pole independently heated to ionize the adjacent gas.

14. The method as set forth in claim 3, in which only the base metal is fused to flow upon the tip to form a weld.

15. The method as set forth in claim 3, in which metal of both tip and base is fused.

16. The method as set forth in claim 3, in which the tip is completely fused and spheroided.

17. The method as set forth in claim 3, in which the base is a relatively low melt point metal and the tip is a relatively high melt point metal.

18. The method as set forth in claim 3, in which the metal of the base has a heat susceptible temper and the base is cooled except immediately adjacent to the tack sufficiently to prevent loss of temper.

19. The method of tipping a metallic base which comprises tacking a metallic tip to a metallic base, the area of contact being relatively very small, vertically suspending the base above the tip, and welding the tip to the base while the tip is supported by the tack.

20. The method as set forth in claim 19 in which the heat is supplied substantially entirely through the tip.

21. The method comprising attaching a metallic tip to a metallic nib in a generally central asymmetric position, the area of contact between tip and nib being small, maintaining said nib vertically above the tip and fusing a portion of the metal adjacent to the tack, whereby the tip centers itself upon said nib and is welded thereto.

22. The method as set forth in claim 21, in which the heat is supplied substantially entirely through the tip.

23. The method as set forth in claim 21, in which the heat is supplied substantially entirely through the tip and the tip is fused.

24. The method of tipping a pen which comprises tacking a tip to the pen, the tack providing poor heat conductivity between tip and pen and fusing metal adjacent to the tack by heat supplied substantially entirely through the tip, whereby the pen tip is welded to the pen.

25. The method which comprises attaching a metallic tip to a metallic pen nib in a generally central asymmetric position, the area of contact between tip and nib being small, maintaining the nib vertically above the tip and fusing a portion of the metal adjacent to the tack, whereby the tip centers itself upon the nib and is welded thereto.

26. In the method of welding a metallic tip to a metallic base, the steps of tacking the tip to the base by passing a sudden large electrical discharge between said base and tip while lightly contacting them, said discharge being only sufficient to fuse a small area of the contacting metals.

27. The method as set forth in claim 26 in which the base is a pen nib.

28. The method as set forth in claim 26 in which the period of the discharge and the speed of approach of the tip and base are correlated to maintain contact between them during fusion.

29. Apparatus for tacking a metallic tip to a metallic base which comprises means for moving said tip and base into light contact, means for producing an electric discharge between base and tip as they come into proximity, and an inductance in the discharge circuit for prolonging the discharge to maintain contact between base and tip during progressive fusion.

CARL PFANSTIEHL.